United States Patent [19]

Lee et al.

[11] Patent Number: 5,740,329
[45] Date of Patent: Apr. 14, 1998

[54] ROBOT WRIST HAVING AN OFFSET AND A METHOD FOR ORIENTATING A ROBOT WRIST HAVING AN OFFSET

[75] Inventors: Kwang Sae Lee, Pusan; Young Il Youm, Pohang, both of Rep. of Korea

[73] Assignees: Pohang Iron & Steel Co., Ltd.; Research Institute of Industrial Science & Technology, both of Kyong Sang Book-Do, Rep. of Korea

[21] Appl. No.: 987,167

[22] Filed: Dec. 7, 1992

[30] Foreign Application Priority Data

Dec. 7, 1991 [KR] Rep. of Korea .............. 91-22408

[51] Int. Cl.[6] ............................... G05B 15/00
[52] U.S. Cl. .................. 395/97; 395/80; 395/86
[58] Field of Search ............................ 395/80, 85–87, 395/97; 318/568.19; 901/14–18

[56] References Cited

U.S. PATENT DOCUMENTS

| | | | |
|---|---|---|---|
| 4,823,279 | 4/1989 | Perzley et al. | 364/513 |
| 4,887,222 | 12/1989 | Miyake et al. | 395/98 |
| 5,157,315 | 10/1992 | Miyake et al. | 395/97 |
| 5,159,249 | 10/1992 | Megherbi | 318/568.1 |
| 5,187,418 | 2/1993 | Minami et al. | 318/568.19 |

OTHER PUBLICATIONS

"A new Technique of Eliminating Void in Workspace of a Manipulator with an Offset Wrist", K.S. Lee, J.H. Kim, K.W. Jeong.

Richard P. Paul and Charles N. Stevenson, "Kinematics of Robot Wrists", The International Journal of Robotics Research, vol.2 No. 1, Spring 1983.

*Primary Examiner*—Tariq R. Hafiz
*Attorney, Agent, or Firm*—Webb Ziesenheim Bruening Logsdon Orkin & Hanson, P.C.

[57] ABSTRACT

The present invention relates to a method of determining degrees of an angle between the rotational axes of each of three articulations constituting robot wrist, and more particularly to a method of determining kinematic parameters for robot wrist, wherein a method of determining twist angle between the rotational axes is improved so that robot wrist can orient arbitrarily without regard to position of robot arm when attaching robot wrist having an offset in which the rotational axes of three articulations do not coincide at one point, to the robot arm of an articulated type. According to the present invention, if finding a length $l_3$ of articulation upper part of robot arm, a virtual length of upper articulation of robot arm ($l_3°$) by using offset link length ($d_5$) of robot wrist, and twist angle ($\alpha_4$) and twist angle ($\alpha_5$) by the invented formulas, the robot wrist composed of an offset can orient arbitrarily at any positions, whereby the conventional problems have been eliminated and the effects enabling to improve the orienting region of robot wrist have been obtained.

10 Claims, 6 Drawing Sheets

ROBOT WRIST HAVING AN OFFSET AND A METHOD FOR ORIENTATING A ROBOT WRIST HAVING AN OFFSET

BACKGROUND OF THE INVENTION

1. Field of the Invention

The present invention relates to a method of determining the twist angle between the rotational axes of each articulation with regard to three articulations constituting the robot wrist, and more particularly to a method of determining kinematic parameters for the robot wrist, in which a method of determining the twist angle between the rotational axes is developed so that the robot wrist can orient arbitrarily at any positions without regard to the location of the robot arm when attaching the robot wrist in which the rotational axes of three articulations do not coincide at one point, to the robot arm of an articulated type.

2. Description of the Prior Art

In general, a robot necessitates six articulations in order for the end-effector of the robot to select a certain position and posture in the three-dimensional workspace. The aforementioned six articulations are composed of three articulations for selecting a position and of three articulations for selecting a posture. Of these, the part having three articulations for selecting a posture is referred to as the wrist. The wrist has to be constructed so that it can orient arbitrarily at that position without regard to the construction of the robot arm, when the aforementioned robot arm equipped with 3 degrees of freedom for determining a posture selected a certain position. Of the robot wrist manufactured up to now, there are two wrists; one is that the rotational axes of each articulation coincide at one point and the other is that the rotational axes of each articulation do not coincide at one point. As for the wrist having the rotational axes of the three articulations which coincide at one point, the fact that the scope in which the robot wrist can be oriented is restricted in accordance with the magnitude of the twist angle between the rotational axes, was publicly disclosed (R. P. Paul, "Kinematics of Robot Wrist", J. of Robotics Research, 1983). In order to eliminate such restriction, a method of determining twist angle between the rotational axes has been proposed. As for the wrist having rotational axes of the three articulations which do not coincide at one point, i.e. having an offset the fact that the scope in which the wrist cannot be oriented exists in accordance with the construction of said three articulations, was disclosed (U.S. Pat. No. 4,823,279, Unimation, Inc., Inventor: William Perzley, etc.). However, a method of determining the twist angle between the rotational axes of three articulations having said rotational axes which do not coincide at one point, has not been disclosed yet. It depends only upon the method of determining the twist angle for robot wrist in which said rotational axes coincide at one point. In consequence, if attaching the wrist having the construction of an offset which kinematic parameters were determined in accordance with the existing method of determining kinematic parameters, to the robot arm of an articulated type, the wrist cannot orient arbitrarily while it was originally intended to do.

The method of determining the twist angle between the rotational axes of three articulations constituting the conventional robot wrist will be explained in more detail as the following.

Figure 1A:
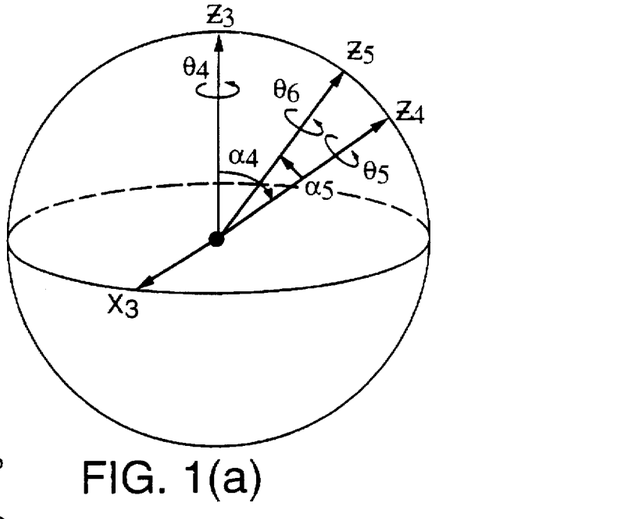
FIGS. 1a), b) and c) illustrate orienting region of the wrist having no offset and more particularly, FIG. 1a) is an initial coordinate system of wrist.

First, the construction of three articulations constituting the robot wrist is modeled mathematically as shown in FIG. 1a). In the drawing, as for each articulation, its own coordinate system is established and correlation of front articulation and rear articulation is represented as four each of kinematic parameters. The coordination system established in each articulation is the right-angled system having the constituents of X, Y and Z but FIG. 1a) shows only the axes of X and Z. Axis ($Z_3$) is the rotational axis of the first articulation among three articulations constituting the wrist and represents the direction of the robot arm. Axis ($Z_4$) and axis ($Z_5$) are rotational axes of the remaining articulations and axis ($Z_5$) expressly represents the wrist direction. Axis ($X_3$) means X axis of a coordinate system established in the first articulation and under the initial state which each of the rotational axis was not rotated, axis ($X_4$) and axis ($X_5$) of the remaining articulations come to coincide to the X axis of the aforesaid first articulation. Of four kinematic parameters, the most important parameter of determining orienting region of the wrist is the twist angle between Z axes and is denoted by α in the drawing. Twist angle ($α_4$) is shown between axis ($Z_3$) and axis ($Z_4$), and twist angle ($α_5$) is shown between axes ($Z_4$) and ($Z_5$).

Figure 1B:
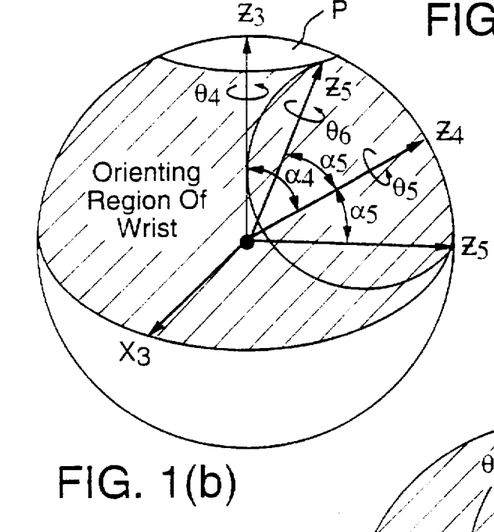
FIG. 1b) is a graph representing orienting region when $\alpha_4 \neq \alpha_5$, and FIG. 1c) is a graph representing orienting region when $\alpha_4 = \alpha_5$.
Figure 1C:
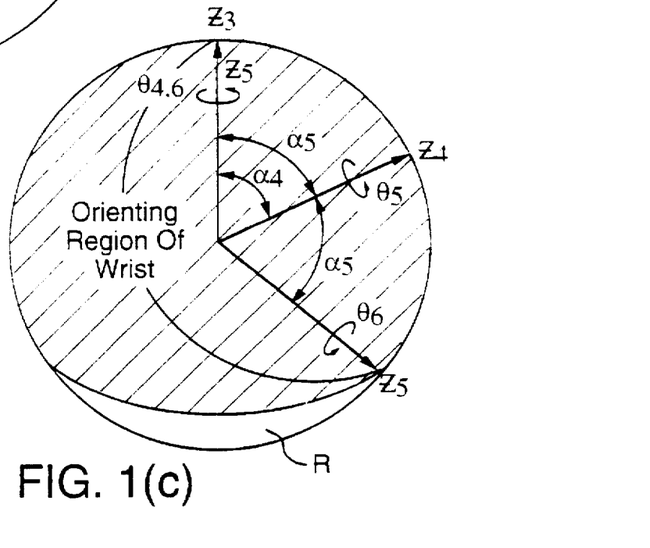

It is known up to now that when twist angle ($α_4$) and twist angle ($α_5$) have the different value from each other, an axis ($Z_5$) cannot exist in a conical space region (cone) (P) formed around axis ($Z_3$) if axis ($Z_5$) rotates about axis ($Z_4$) as shown in FIG. 1b) (R. P. Paul, "Kinematics of Robot Wrist", J. of Robotics Research, 1983). This means that when axis ($Z_3$) is the direction of the robot arm and axis ($Z_5$) is the wrist direction, there exists a certain space between axis ($Z_3$) and axis ($Z_5$) and thus the robot wrist cannot orient in this region. However, if twist angle ($α_4$) and twist angle ($α_5$) have the equal value from each other, the direction of the robot arm may coincide to the wrist direction and thus the wrist can orient arbitrarily in the region indicated with a slant line. Also, the region (R) which is not represented as a slant line in FIG. 1c) completely disappears if twist angle ($α_4$) and twist angle ($α_5$) become 90° respectively.

As the result, the technique of determining kinematic parameters for the robot wrist used up to date requires that twist angle ($α_4$) and twist angle ($α_5$) should have equal value and that each of the angle size becomes 90° respectively. As for most conventional robot wrist, such method of determining the parameters was used.

Meanwhile, the aforesaid method of determining kinematic parameters applies to the wrist with an offset having the construction in which the rotational axes do not coincide at one point. Especially if attaching the wrist having such construction, to the robot arm of an articulated type, original object thereof cannot be achieved.

Namely, as for such kind of robot, there exist some region in which the robot wrist cannot be oriented arbitrarily. Actually in the industrial fields, such kind of robot is used mostly but all of them have the drawbacks mentioned above.

Figure 2:
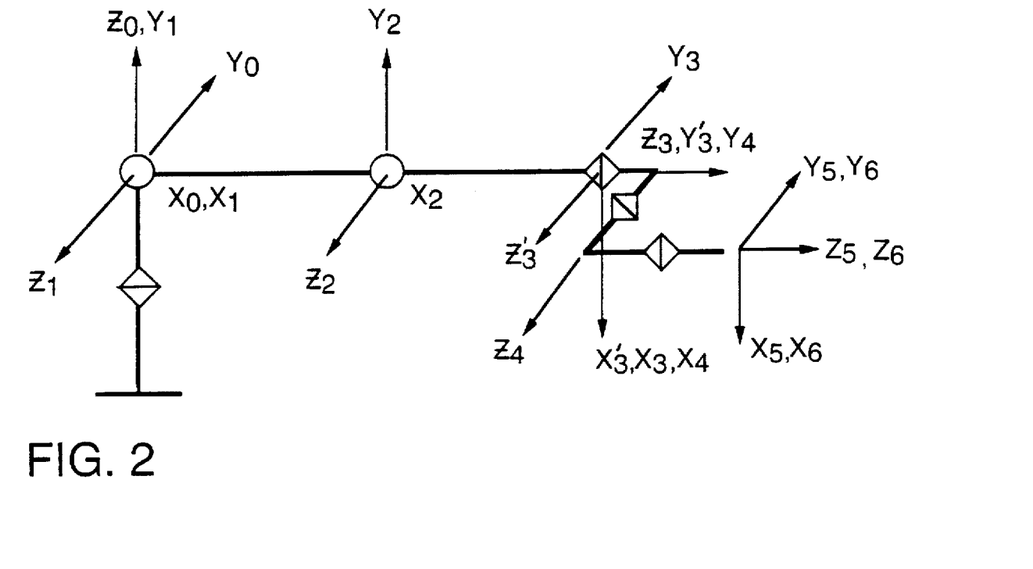
FIG. 2 is a schematic drawing representing robot model with wrist having an offset.

The problems of the robot being used at present will be explained in detail with reference to the accompanying drawings. FIG. 2 shows a mathematically modeled robot with wrist in which the rotational axes of three articulations do not coincide at one point, which was attached to the arm of an articulated type. Kinematic parameters of said robot are shown in the following Table 1.

TABLE 1

| Articulation | α | a | d | θ |
|---|---|---|---|---|
| 1 | 90 | 0 | 0 | $θ_1$ |
| 2 | 0 | $l_2$ | 0 | $θ_2$ |
| 3' | 0 | $l_3$ | 0 | $θ_3$ |

TABLE 1-continued

| Articulation | α | a | d | θ |
|---|---|---|---|---|
| 3 | −90 | 0 | 0 | −90 |
| 4 | 90 | 0 | 0 | $\theta_4$ |
| 5 | −90 | 0 | $d_5$ | $\theta_5$ |
| 6 | 0 | 0 | 0 | $\theta_6$ |

In the above Table 1, twist angle ($\alpha_4$) and twist angle ($\alpha_5$) of articulation (4) and articulation (5) are 90° respectively. These values are those determined according to the conventional method of determining kinematic parameters. The denotation (−) represents the case where the initial coordinate position is the opposite direction. With regard to a distance (d) between the rotational axes, it can be seen from the above Table that there exist a distance ($d_5$) between articulation (4) and articulation (5). The value of this distance ($d_5$) becomes 0 if the rotational axes of three articulations coincide at one point.

If the distance ($d_5$) is 0, no problem arises in the conventional method of determining kinematic parameters. If it is not 0 as mentioned above, problems arise as the following.

Figure 3:
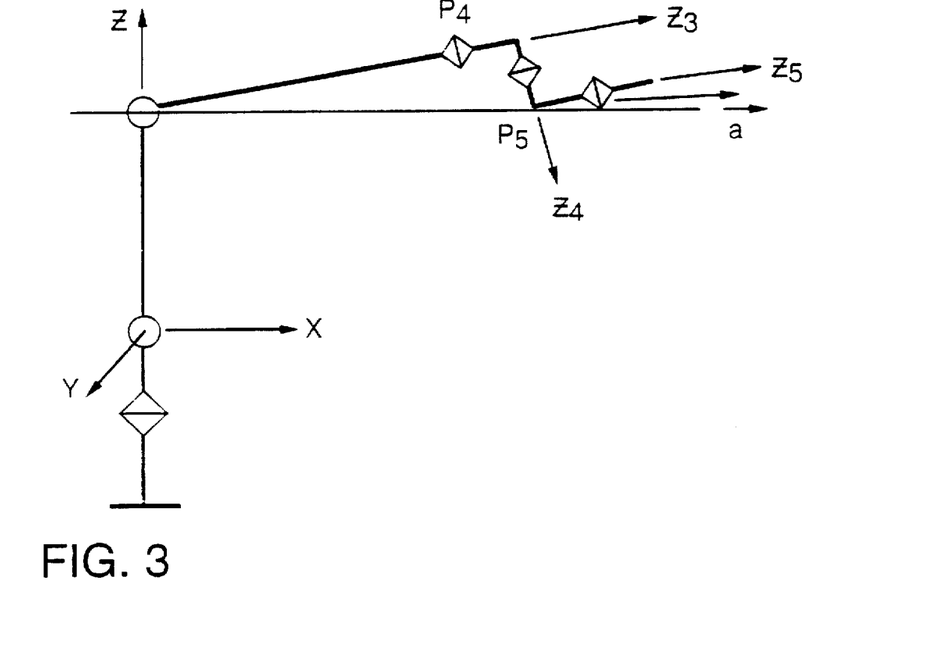
FIG. 3 is a graph representing an example of wrist direction which robot cannot orient.
Figure 4:
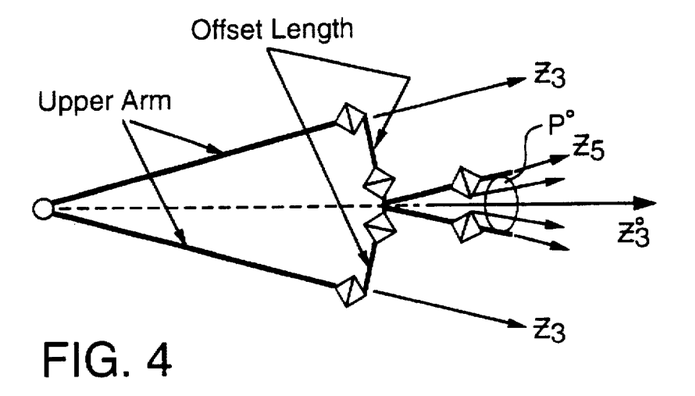
FIG. 4 is a drawing illustrating a space in which wrist cannot orient.

As shown in FIG. 3, supposing that the robot should assume a posture of $\vec{a}$ at point ($P_5$) in workspace, the robot should determine the posture of $\vec{a}$ positioning at point ($P_5$) and by moving articulation (4) and articulation (5). However, axis ($Z_5$) representing the wrist direction moves only outside the conical region ($P^o$) and cannot reach inside the conical region ($P^o$) as shown in FIG. 4, even if said robot causes articulation (4) and articulation (5) to rotate. That is, the robot wrist cannot assume the posture of $\vec{a}$ in case there exist a virtual posture $\vec{a}$ within the aforesaid conical region ($P^o$).

In conclusion, in case of the robot wrist having the rotational axes of three articulations which do not coincide at one point, there exist some region in which the robot wrist cannot be oriented at a virtual position in workspace even though twist angle ($\alpha_4$) and twist angle ($\alpha_5$) are equal and 90° according to the conventional method of determining kinematic parameters. As the result, kinematic parameters, i.e. twist angles ($\alpha_4$) and ($\alpha_5$) should not be equal or 90° when attaching the wrist with an offset, to the robot arm of an articulated type.

SUMMARY OF THE INVENTION

Therefore, reasons for such problems were analyzed and presented as well as an improved method of determining new kinematic parameters was developed in the present invention. First, reasons for such problems are described below.

Figure 5:
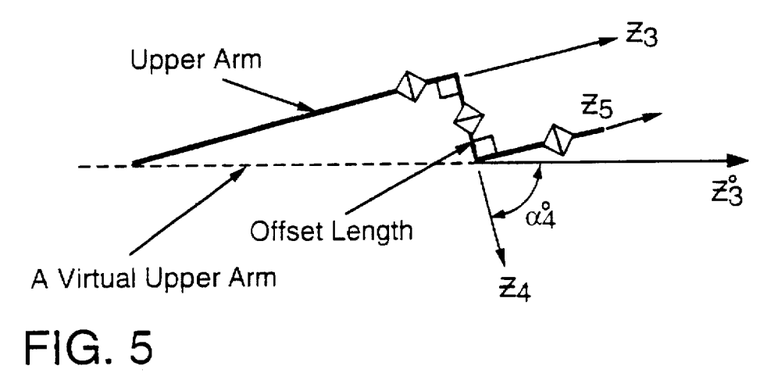
FIG. 5 is a drawings illustrating twist angle ($\alpha_4°$) of $Z_4$ to newly defined arm direction ($Z_3°$).

In case of the aforesaid robot, twist angle ($\alpha_4$) of axis ($Z_4$) to axis ($Z_3$) was determined 90° at the time of determining kinematic parameters. When an offset in wrist was involved in determining a position, axis ($Z_3$) representing the arm direction can be defined as new direction, axis ($Z_3^o$) as shown in FIG. 4. In case twist angle between axis ($Z_3^o$) and axis ($Z_4$) be $\alpha_4^o$, the value is not 90° (please refer to FIG. 5).

Axis ($Z_3^o$) herein is the direction connecting the third articulation to the end point of an offset link of wrist and the connection link between these two points is defined as a virtual robot upper arm. That is, the aforesaid conventional robot comprises the articulation of which the upper part length is $$l_3^o \left(= \sqrt{l_3^2 + d_5^2}\right),$$

and has the similar kinematic characteristics to the robot with wrist having no offset in which twist angle ($\alpha_4^o$) and twist angle ($\alpha_5$) between the articulations constituting wrist are different from each other. Consequently, there always exist the region in which the robot wrist cannot be oriented.

Also, in case of the robot having the aforesaid construction, the size and the shape of the region in which the robot wrist cannot be oriented are not equal at the workpoint in all workspace. The computer simulation reflects this well and the results thereof are as follows. The values of kinematic parameters in the robot used in the computer simulation became; $l_2$=600 mm, $l_3$=800 mm, $d_5$=100 mm in the above Table 1. Supposing one cross section in workspace in the simulation, it was investigated how the region in which the robot wrist cannot be oriented varies when the robot arm moved toward vertical or horizontal direction of the cross section.

Figure 6:
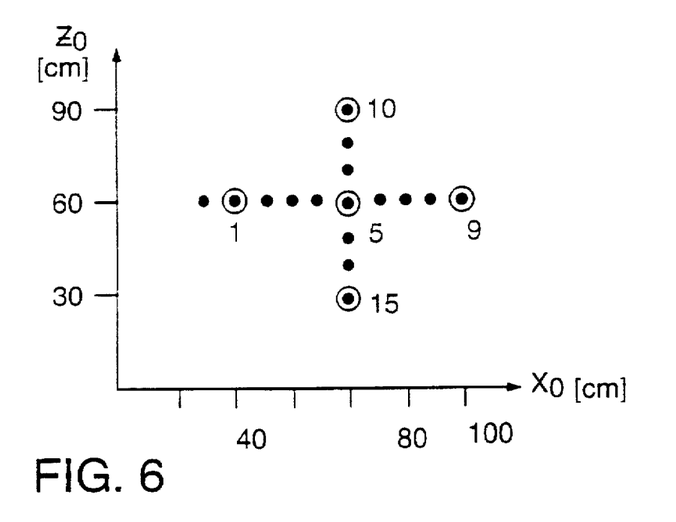
FIG. 6 is a graph representing workpoint for the computer simulation.
Figure 7:
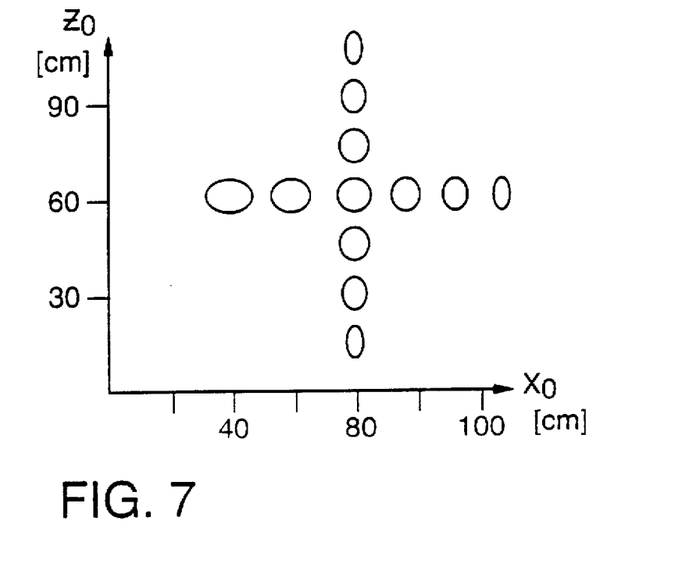
FIG. 7 is a drawing illustrating variation of the space in which wrist cannot orient.

This section is a plane which workspace of the robot was cut toward the direction $X_0$, $Z_0$, in FIG. 2, and when rotating this around axis $Z_0$, total workspace appears. The characteristics from the aforesaid plane are the same ones from the plane obtained by rotating this plane around the $Z_0$ axis. In order to see how the space in which the robot cannot be oriented at each point in the plane varies, several representing points were selected as shown in FIG. 6 and the conical space in which the robot cannot be oriented at each point was drawn with size and shape of the base. As the result, shape variation of the space could be seen as shown in FIG. 7 and by finding vertical angle and horizontal angle on the basis of the angular point of the conical space, there is shown the size of the space in Table 2. FIG. 7 shows that the conical space shrinks horizontally as the robot stretches its arm on the basis of center of workplane and expand horizontally as the robot shrinks. Consequently, it can be seen that the size and the shape of the conical space which the robot cannot be oriented varies according to the location of the robot.

TABLE 2

| | (Unit: Deg) | |
|---|---|---|
| Position | Horizontal angle | Vertical angle |
| 1 | 28.4210 | 14.2500 |
| 2 | 22.9454 | 14.2500 |
| 3 | 19.1673 | 14.2500 |
| 4 | 16.4252 | 14.2500 |
| 5 | 14.2500 | 14.2500 |
| 6 | 12.7582 | 14.2500 |
| 7 | 11.4686 | 14.2500 |
| 8 | 10.3793 | 14.2500 |
| 9 | 9.3550 | 14.2500 |
| 10 | 13.1837 | 14.2500 |
| 11 | 13.7927 | 14.2500 |
| 12 | 14.1376 | 14.2500 |
| 13 | 13.7977 | 14.2500 |
| 14 | 13.2550 | 14.2500 |

As shown in Table 2, in case of the wrist with an offset, some region in which the robot cannot be arbitrarily oriented appeared even when twist angles ($\alpha_4$) and ($\alpha_5$) are equal and the magnitude thereof is 90°. That is because that the wrist offset affected determination of the position and thus the new arm direction ($Z_3^o$) was defined, and the twist angle ($\alpha_4^o$) between axis ($Z_4$) and axis ($Z_3^o$) is not 90°.

Accordingly, it can be seen that when determining kinematic parameters of the robot wrist with an offset, one of kinematic parameters, i.e., the twist angles ($\alpha_4$) and ($\alpha_5$) must not be equal and the magnitude thereof not be 90°.

As the result of analyzing the reasons for problems, the present invention was conceived to eliminate such problems. An object of the present invention is to provide for a method of determining kinematic parameters of the robot wrist with an offset with regard to a method of determining twist angle between the rotational axes so that the robot can be oriented arbitrarily at any positions without regard to position of the robot arm when attaching the robot wrist in which the rotational axes of three articulations do not coincide at one point, to the robot arm.

To achieve such object, the present invention provides for a method of determining kinematic parameters for the robot wrist with an offset in which the rotational axes of articulation constituting the wrist do not coincide at one point, wherein when the aforesaid twist angle ($\alpha_4$) is determined first within the range of ($0 \leq |\alpha_4| \leq 180°$) with regard to the twist angles ($\alpha_4$) and ($\alpha_5$) between the rotational axes of three articulations constituting the wrist, the magnitude of the aforesaid twist angle ($\alpha_5$) is;

$$(l_3°)^2=(l_3)^2+(d_5)^2-2*l_3*d_5*\cos(180°-\alpha_4) \quad (1)$$

$$\alpha_4° = a\cos\left(\frac{(l_3°)^2+(d_5)^2-(l_3)^2}{2*l_3°*d_5}\right), \quad (2)$$

determined to be equal to the twist angle ($\alpha_4°$) determined by the formulas (1) and (2) mentioned above, the signs thereof accord to the established direction of the initial coordinate system, $l_3$ therein is a length of robot upper arm, $d_5$ is a length of an offset in wrist and results of the formula (2) are $0 \leq \alpha_4° \leq 180°$.

Also, the present invention provides for a method of determining kinematic parameters of the robot wrist having an offset in which the rotational axes of the articulation constituting the wrist do not coincide at one point, wherein the method of determining kinematic parameters of the robot wrist is characterized in that when the aforesaid twist angle ($\alpha_5$) is determined first within the range of ($0 \leq |\alpha_5| \leq 180°$) with regard to the twist angles ($\alpha_4$) and ($\alpha_5$) between the rotational axes of three articulations constituting the wrist, the magnitude of twist angle ($\alpha_4$) is determined to be equal to twist angle ($\alpha_4^\infty$) obtained by the following formulas (3) and (4);

$$(l_3)^2=(l_3°)^2+(d_5)^2-2*l_3°*d_5*\cos(\alpha_5) \quad (3)$$

$$\alpha_4^\infty = 180° - a\cos\left(\frac{(l_3)^2+(d_5)^2-(l_3°)^2}{2*l_3*d_5}\right) \quad (4)$$

the signs thereof accord to the established direction of the initial coordinate system, $l_3°$ therein is a virtual link length between end point ($P_3$) of articulation upper part and end point ($P_5$) of an offset, and the results of the formula (4) are $0 \leq \alpha_4^\infty \leq 180°$.

And according to the present invention, the robot can orient at any positions without regard to position of the robot arm if attaching the robot wrist in which the rotational axes of three articulations do not coincide at one point, to the robot arm of an articulated type. There exist some space in which the robot cannot be oriented, but the space becomes smaller than that formed according to the conventional method of determining kinematic parameters if some value is assigned for one of the twist angles ($\alpha_4$) and ($\alpha_5$), and the other is determined to become more appropriate to the value calculated by the formulas (1) and (2), or the formulas (3) and (4).

Further, a method of determining kinematic parameters of the robot wrist according to the present invention is char-
acterized in that with regard to the twist angle ($\alpha_4$) determined above, magnitude of the aforesaid twist angle ($\alpha_5$) is determined within the range of $(2 * \alpha_4° - |\alpha_4|) < \alpha_5 < |\alpha_4|$ or $(180° - |\alpha_4|) < \alpha_5 < (180° - 2 * \alpha_4° + |\alpha_4|)$, and the signs thereof are determined at the time of establishing the initial coordinate system.

Also, a method of determining kinematic parameters of the robot wrist according to the present inventin is characterized in that with regard to the twist angle ($\alpha_5$) determined above, magnitude of the aforesaid twist angle ($\alpha_4$) is determined within the range of $|\alpha_5| < \alpha_4 < \alpha_4^\infty$ or $(180° - \alpha_4^\infty) < \alpha_4 < (180° - |\alpha_5|)$, and the signs thereof are determined at the time of establishing the initial coordinate system.

BRIEF DESCRIPTION OF THE DRAWINGS

The above and other objects, features and advantages of the present invention will be more clearly understood from the following detailed description taken in conjunction with the accompanying drawings, in which:

FIGS. 9a), b), c) and d) are drawings illustrating variation of orienting region of wrist having an offset when $\alpha_4$ is 90° and when adjusting kinematic parameter $\alpha_5$.

DETAILED DESCRIPTION OF THE INVENTION

The present invention will be explained in more detail with reference to the drawings.

Figure 8:
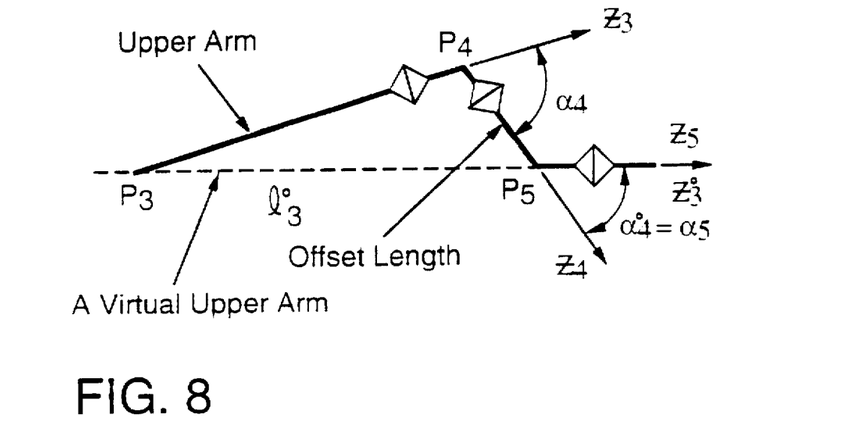
FIG. 8 is a drawing illustrating relations of parameters for determining kinematic parameters $\alpha_4$ and $\alpha_5$ according to the new method of determining kinematic parameters thereof.

In FIG. 8 according to the present invention, the vector connecting point ($P_3$) and point ($P_5$) is defined as axis ($Z_3°$) supposing that point ($P_3$) and point ($P_4$) be the both end points of upper articulation link of the robot arm and that point ($P_5$) be the end point of link offset in wrist. The length from point ($P_3$) to point ($P_5$) is defined as a virtual length of the robot upper arm ($l_3°$). When twist angle ($\alpha_4$) between axis ($Z_3$) and axis ($Z_4$) was determined a virtual angle in the robot wrist, the twist angle ($\alpha_5$) between axis ($Z_4$) and axis ($Z_5$) is determined to be equal to the twist angle ($\alpha_4°$) between axis ($Z_3°$) and axis ($Z_4$) or to be $\alpha_5 = 180° - \alpha_4°$. The signs herein accord to the determined direction of the initial coordinate system.

In FIG. 8, $l_3$ is the robot arm length of upper articulation part and $d_5$ is the length of an offset.

A virtual robot arm length ($l_3°$) therein is as the following.

$$(l_3°)^2=(l_3)^2+(d_5)^2-2 * l_3 * d_5 * \cos(180°-\alpha_4) \qquad (1)$$

Also, the aforesaid twist angle ($\alpha_4°$) is found as the following.

$$\alpha_4° = a\cos\left(\frac{(l_3°)^2 + d_5^2 - l_3^2}{2 * l_3° * d_5}\right) \qquad (2)$$

As for twist angle ($\alpha_4$) and twist angle ($\alpha_5$), twist angle ($\alpha_5$) can be determined after twist angle ($\alpha_4$) is determined as a virtual value, and alternatively twist angle ($\alpha_4$) can be determined after twist angle ($\alpha_5$) is determined. If twist angle ($\alpha_5$) is determined after twist angle ($\alpha_4$) is determined, twist angle ($\alpha_5$) can be determined by formulas (1) and (2) above, and if twist angle ($\alpha_4$) is determined after twist angle ($\alpha_5$) is determined, the procedures are carried out as follows.

If twist angle ($\alpha_5$) was determined first a virtual value, point ($P_3$), the end point of upper articulation link of robot arm is fixed on the extension line of $Z_5$ vector as shown in FIG. 8.

Then, a virtual link length ($l_3°$) connecting point ($P_3$) to point ($P_5$) is found as the following.

$$(l_3)^2=(l_3°)^2+(d_5)^2-2 * l_3° * d_5 * \cos(\alpha_5) \qquad (3)$$

If a link ($l_3°$) is found, twist angle ($\alpha_4^{\infty}$) is found by the following formula (4);

$$\alpha_4^{\infty} = 180° - a\cos\left(\frac{(l_3)^2 + (d_5)^2 - (l_3°)^2}{2 * l_3 * d_5}\right), \qquad (4)$$

and the magnitude of twist angle ($\alpha_4$) is determined to be equal to the twist angle ($\alpha_4^{\infty}$) and the signs thereof are determined at the time of establishing the initial coordinate system. Or, the magnitude of the aforesaid twist angle ($\alpha_4$) become $180°-\alpha_4^{\infty}$ according to the direction of the initial coordinate system, the signs thereof are determined at the time of establishing the coordinate system.

By virtue of twist angle ($\alpha_4$) and twist angle ($\alpha_5$) determined according to the aforesaid method of determining kinematic parameters, the robot can orient arbitrarily at any positions.

As for the aforesaid results obtained by the method of determining kinematic parameters, the computer simulation was conducted. As an example, twist angle ($\alpha_4$) was determined 90° in the simulation and twist angle ($\alpha_5$) was calculated by the aforesaid formula (2) to be 82.875°. The final value of $\alpha_5$ according to the direction of determining the initial coordinate system becomes $-82.875°$.

Figures 9A, 9B:
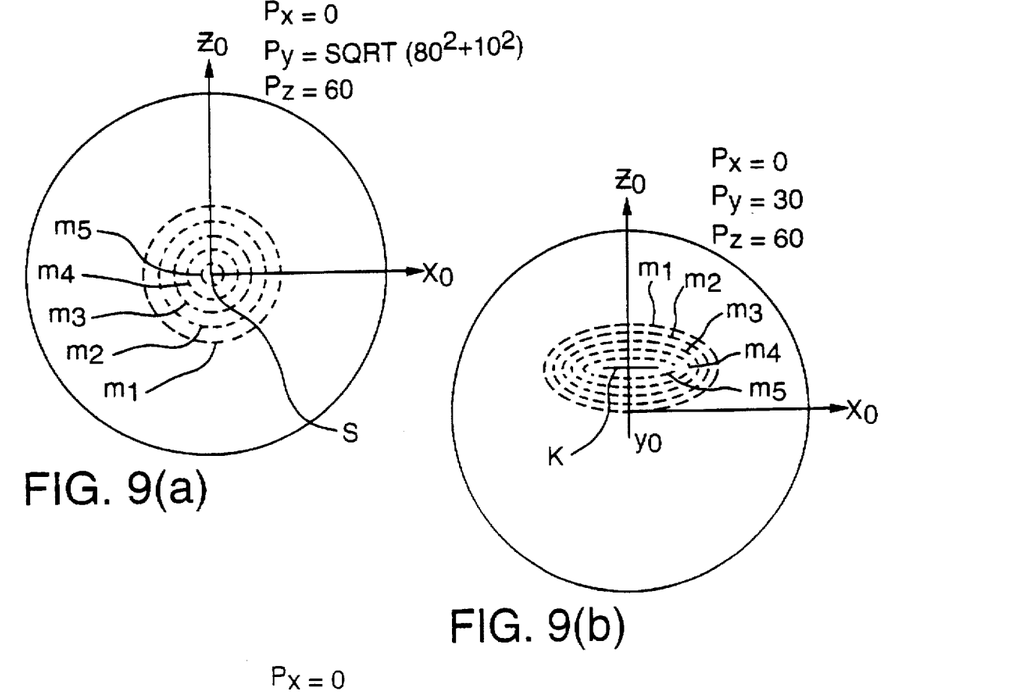
Figures 9C, 9D:
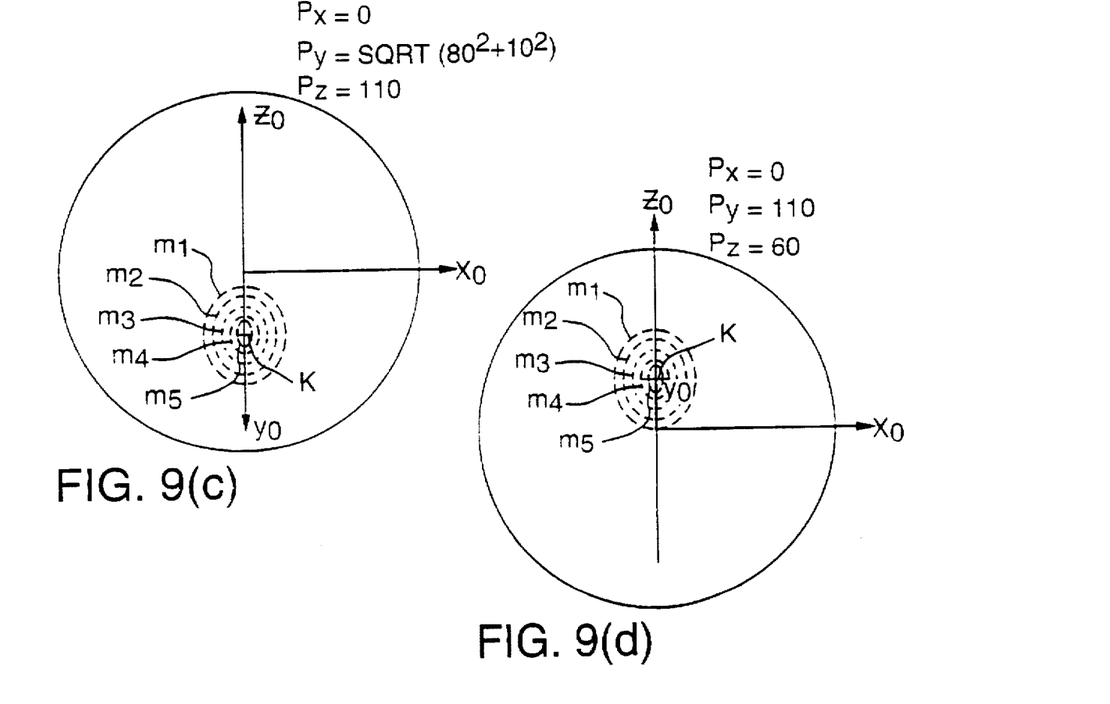

In case where the conventional method of determining kinematic parameters applied to the robot wrist having an offset, there existed some region in which the robot cannot be oriented arbitrarily. However, in case where twist angle ($\alpha_4$) become 90° and twist angle ($\alpha_5$) become $-82.875°$ according to the present invention, the region in which the robot cannot be oriented completely disappears as shown in FIG. 9. FIG. 9a) indicates the region in which the robot wrist cannot be oriented when the offset end point ($P_5$) is at the same height as point ($P_3$) (at position 5 of FIG. 6) at the posture which the robot shown in FIG. 2 erects lower arm vertically. The outmost circle (ml) of the circles indicated with a dot represents the region (a base of the conical space) in which the robot wrist cannot be oriented in case where kinematic parameters were determined ($\alpha_4=90°$, $\alpha_5=-90°$) according to the conventional method. And the innermost part indicated with a dot represents the region in which the robot wrist cannot be oriented when twist angle ($\alpha_4$) was determined to be 90° and twist angle ($\alpha_5$) to be $-82.875°$. The intermediate circles (m2, m3, m4, m5) represent the region in which the robot wrist cannot be oriented when twist angle ($\alpha_4$) is 90° and twist angle ($\alpha_5$) is determined within the range from $-90°$ according to the conventional method of determining kinematic parameters to $-82.875°$ according to the present invention by gradually dividing into several phases.

It can be seen from the foregoing that the region in which the robot wrist cannot be oriented becomes smaller gradually as twist angle ($\alpha_5$) is gradually reduced from $-90°$ to $-82.875°$. And it can be seen that the region in which the robot wrist cannot be oriented completely disappeared in case where twist angle ($\alpha_5$) was determined to be $-82.875°$ finally.

In view of the aforesaid results, another new method of determining kinematic parameters can be defined. That is, after twist angle ($\alpha_4$) is determined as a virtual value, if the magnitude of the aforesaid twist angle ($\alpha_5$) is determined within the range obtained by the following formula (5) with regard to ($\alpha_4°$) determined by the formulas (1) and (2), $$\alpha_4°-(|\alpha_4|-\alpha_4°)<\alpha_5<|\alpha_4| \qquad (5)$$

the size of the space in which the robot wrist cannot be oriented becomes quite smaller than the size of the space formed by the existing method of determining parameters (twist angles ($\alpha_4$) and ($\alpha_5$) are equal).

The aforesaid formula (5) is expressed finally as the following formula (6).

$$(2 * \alpha_4°-|\alpha_4|)<\alpha_5<|\alpha_4| \qquad (6)$$

Also, in $Z_5$ vector of FIG. 8, if the coordinate system is determined at 180° opposite direction initially, the range of the aforesaid formula (6) is expressed as the range of the following formula (7);

$$(180°-|\alpha_4|)<\alpha_5<(180°-2 * \alpha_4°+|\alpha_4|) \qquad (7)$$

And when the aforesaid twist angle ($\alpha_5$) is determined as a virtual value, magnitude of the twist angle ($\alpha_4$) is determined $|\alpha_5|<\alpha_4<\alpha_4^{\infty}$ or $(180°-\alpha_4^{\infty})<\alpha_4<(180°-|\alpha_5|)$, and the signs thereof are determined at the time of establishing the initial coordinate system.

FIGS. 9b), c) and d) show how the region in which the robot wrist having an offset cannot be oriented at positions 1, 10 and 9 of FIG. 6 varies in case where it was determined according to the conventional method of determining kinematic parameters and where determined according to the present invention.

One of the important facts can be found out from the results of the aforesaid simulation. That is, as for the conical space in which the robot wrist cannot be oriented, the size and the shape thereof vary according to the position of the robot in workspace. However, said space becomes one dot(s) and disappears when the base of the space becomes a complete circle as shown in FIG. 9a) if twist angle ($\alpha_4$) and twist angle ($\alpha_5$) are determined in such a manner as described in the formulas (1) and (2). And when the base of the aforesaid space is an ellipse as shown in FIGS. 9b), c) and d), the space becomes a line (k) and disappears. This line means that the wrist direction ($Z_5$) moves along the line if rotating $\theta_4$ in 0°–360° after determining the position of the robot. The reasons are as the following.

Figure 10A:
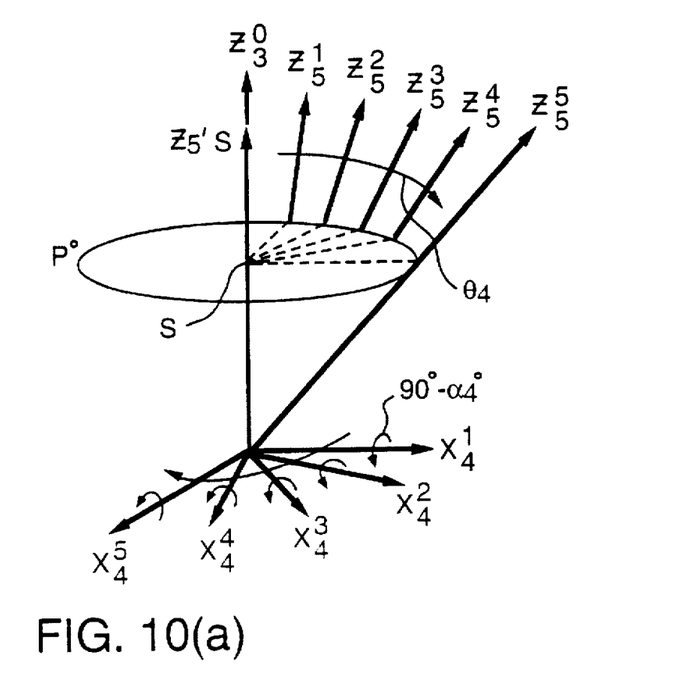
FIGS. 10a) and b) are drawings illustrating the reason why the conical space in which the base forms an ellipse type disappeared from FIGS. 9b), c) and d).
Figure 10B:
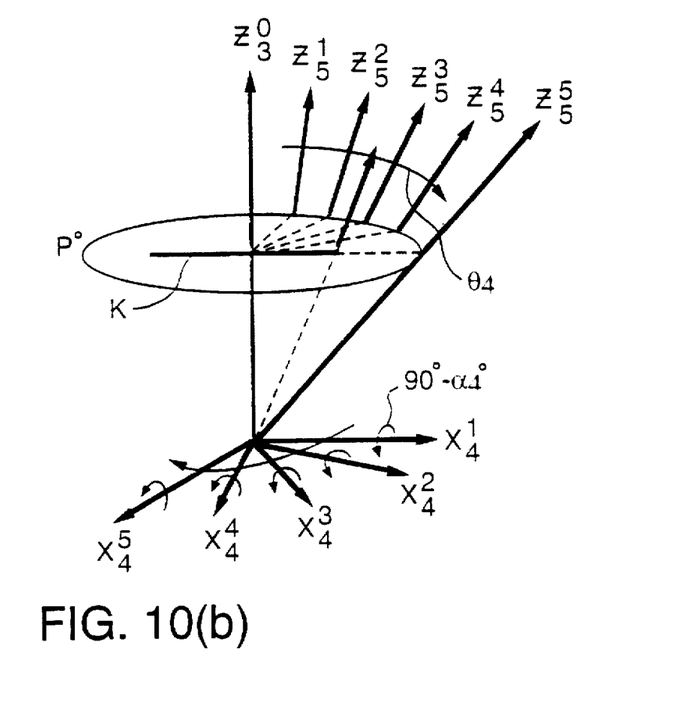

It is supposed in FIG. 10 that $Z_3^o$ be the newly defined arm direction and $Z_5^1, Z_5^2, Z_5^3 \ldots, X_4^1, X_4^2, X_4^3 \ldots$ be $Z_5$ and $X_4$ when $\alpha_4=90°$, $\alpha_5=-90°$.

If rotating $\theta_4$ in 0°–360° after the position of the robot is determined at a point, $Z_5$ becomes $Z_5^1, Z_5^2, Z_5^3 \ldots$ and $X_4$ becomes $X_4^1, X_4^2, X_4^3 \ldots$. The link offset in the wrist herein affects $X_4$ and the track of $X_4$ moves onto a curved surface rather than onto a plane. As $\alpha_5$ is the value of determining the volumes for rotating $Z_5$ around $X_4$ vector, the existing $Z_5^1, Z_5^2, Z_5^3 \ldots$ center on one dot or line when changing $\alpha_5$ from the existing $-90°$ to $-82.875°$ in accordance with the method proposed in the present invention. FIG. 10a) shows the shape that when the base of the conical space in which the robot wrist cannot be oriented is a complete circle, $Z_5$ vector centers on one dot and the space disappears. FIG. 10b) shows the shape that when the base of the conical space is an ellipse, $Z_5$ vector centers on one line and this space disappears.

Consequently, according to the present invention mentioned above, the robot wrist can orient arbitrarily at any mentioned above, the robot wrist can orient arbitrarily at any positions only when kinematic parameters, i.e. twist angles $(\alpha_4)$ and $(\alpha_5)$ are determined by the formulas (1) and (2) or by the formulars (3) and (4). Also, the space in which the robot wrist cannot be oriented shrinks gradually as twist angle $(\alpha_4)$ is 90° and twist angle $(\alpha_5)$ is gradually reduced from the existing $-90°$ to $-82.875°$ obtained by the formulas (1) and (2). That is, after one of twist angle $(\alpha_4)$ and twist angle $(\alpha_5)$ is determined as a virtual value, if the other is determined to be more approximate to the value obtained by the formulas (1) and (2) or the formulas (3) and (4), the space in the space in which the robot wrist cannot be oriented becomes smaller as compared with the existing method of determining kinematic parameters.

As the result, the present invention obtains the effects that the robot wrist can be oriented at any positions without regard to the position of the robot arm when attaching the robot wrist in which the rotational axes of three articulations do not coincide at one point, to the robot arm of an articulated type.

What is claimed is:

1. A method of orientating three rotational axes of articulation of a robot wrist having an offset in which said rotational axes of articulations constituting said robot wrist do not coincide at one point, wherein $\alpha_4$ and $\alpha_5$ are twist angles between said three rotational axes of articulation, said method comprising the steps of:

positioning two of said three rotational axes of articulation wherein said twist angle $\alpha_4$ is within the range of $0 \leq |\alpha_4| \leq 180°$ with regard to said twist angles $\alpha_4$ and $\alpha_5$ between three said rotational axes of articulations constituting said robot wrist, and positioning the remaining one of said three rotational axes of articulation wherein said twist angle $\alpha_5$ wherein the magnitude of said twist angle $\alpha_5$ is determined to be equal to a twist angle $\alpha_4^o$ which is determined by the following formulas:

$$\alpha_4^o = a\cos\left(\frac{(l_3^o)^2 + (d_5)^2 - (l_3)^2}{2 * l_3^o * d_5}\right)$$

wherein the signs of said twist angles $\alpha_4$ and $\alpha_5$ are according to an established direction of an initial coordinate system, $l_3$ is a length of a robot upper arm, $d_5$ is a length of said wrist offset, and $0 \leq \alpha_4^o \leq 180°$.

2. The method as set forth in claim 1, wherein when said twist angle $\alpha_4$ is determined first as a virtual value; the magnitude of said twist angle $\alpha_5$ is determined to be $180°-\alpha_4^o$ according to said established direction of said initial coordinate system, and said signs of said twist angles of $\alpha_4$ and $\alpha_5$ are determined at the time of establishing said initial coordinate system.

3. The method as set forth in claim 1, wherein when said twist angle $\alpha_4$ is determined first as a virtual value; the magnitude of said twist angle $\alpha_5$ is determined within the range of $(2 * \alpha_4^o - |\alpha_4|) < \alpha_5 < |\alpha_4|$ or of $(180°-|\alpha_4|) < \alpha_5 < (180°-2 * \alpha_4^o + |\alpha_4|)$, and said signs of said twist angles $\alpha_4$ and $\alpha_5$ are determined at the time of establishing said initial coordinate system.

4. The method as set forth in claim 1, wherein when said twist angle $\alpha_4$ is determined first as a virtual value; the magnitude of said twist angle $\alpha_5$ is determined within the range of $2 * \alpha_4^o - 90° < (\alpha_5) < 90°$ if the magnitude of said twist angle $\alpha_4$ is 90°, and said signs of said twist angles $\alpha_4$ and $\alpha_5$ are determined at the time of establishing said initial coordinate system.

5. The method as set forth in claim 1, wherein when said twist angle $\alpha_4$ is determined first as a virtual value; the magnitude of said twist angle $\alpha_5$ is determined within the range of $90° < (\alpha_5) < 270° - 2 * \alpha_4^o$ if the magnitude of said twist angle $\alpha_4$ is 90°, and said signs of $\alpha_4$ and $\alpha_5$ are determined at the time of establishing said initial coordinate system.

6. The method as set forth in claim 1, wherein when said twist angles $\alpha_4$ and $\alpha_5$ are determined, a conical space $P^o$ formed between a robot arm direction $Z_3$ and a wrist direction $Z_5$ is formed as as dot S or a line K, whereby said robot wrist can orient arbitrarily at any positions without regard to the position of said robot arm.

7. A method of orientating three rotational axes of articulation of a robot wrist having an offset in which said rotational axes of articulations constituting said robot wrist do not coincide at one point, wherein $\alpha_4$ and $\alpha_5$ are twist angles between said three rotational axes of articulation, said method comprising the steps of:

positioning two of said three rotational axes of articulation of said robot wrist wherein said twist angle $\alpha_5$ is within the range of $0 \leq |\alpha_5| \leq 180°$ with regard to said twist angles $\alpha_4$ and $\alpha_5$ between three said rotational axes of three articulations constituting said robot wrist, and positioning the remaining one of said three rotational axes of articulation of said robot wrist wherein said twist angle $\alpha_4$ wherein the magnitude of said twist angle $\alpha_4$ is determined to be equal to another twist angle $\alpha_4^{oo}$ which is determined by the following formulas:

$$(l_3)^2 = (l_3^o)^2 + (d_5)^2 - 2 * l_3^o * d_5 * \cos(\alpha_5)$$

$$\alpha_4^{oo} = 180° - a\cos\left(\frac{(l_3)^2 + (d_5)^2 - (l_3^o)^2}{2 * l_3 * d_5}\right)$$

wherein the signs of $\alpha_4$ and $\alpha_5$ are according to an established direction of an initial coordinate system, $l_3^o$ is a virtual link length between an end point $P_3$ of an articulation upper part and end point $P_5$ of said wrist offset, and $0 \leq \alpha_4^{oo} \leq 180°$.

8. The method as set forth in claim 7, wherein when said twist angle $\alpha_5$ is determined first as a virtual value; the magnitude of said twist angle $\alpha_4$ is determined by $180°-\alpha_4^{oo}$ according to said established direction of said initial coordinate system, said signs of $\alpha_4$ and $\alpha_5$ are determined at the time of establishing said initial coordinate system.

9. The method as set forth in claim 7, wherein when said twist angle $\alpha_5$ is determined first as a virtual value; the magnitude of said twist angle $\alpha_4$ is determined within the range of $|\alpha_5|<\alpha_4<\alpha_4^\infty$ or of $(180°-\alpha_4^\infty)<\alpha_4<(180°-|\alpha_5|)$, said signs of $\alpha_4$ and $\alpha_5$ are determined at the time of establishing said initial coordinate system.

10. The method as set forth in claim 7, wherein when said twist angles $\alpha_4$ and $\alpha_5$ are determined, a conical space formed between a robot arm direction and wrist direction is formed as a dot or a line, whereby said robot wrist can orient arbitrarily at any positions without regard to position of said robot arm.

* * * * *

UNITED STATES PATENT AND TRADEMARK OFFICE
CERTIFICATE OF CORRECTION

PATENT NO. : 5,740,329
DATED : April 14, 1998
INVENTOR(S) : Kwang Sae Lee and Young Il Youm It is certified that error appears in the above-identified patent and that said Letters Patent is hereby corrected as shown below:

Column 9 Line 2 "bc" should read --be--.

Claim 1 Column 9 Line 58 after "formulas:" insert
$--(\ell_3^*)^2 = (\ell_3)^2 + (d_5)^2 - 2 * \ell_3 * d_5 * \cos(180° - \alpha_4)--$.

Signed and Sealed this

Twenty-fifth Day of August, 1998

Attest:

BRUCE LEHMAN

*Attesting Officer*     *Commissioner of Patents and Trademarks*